Figure 1:
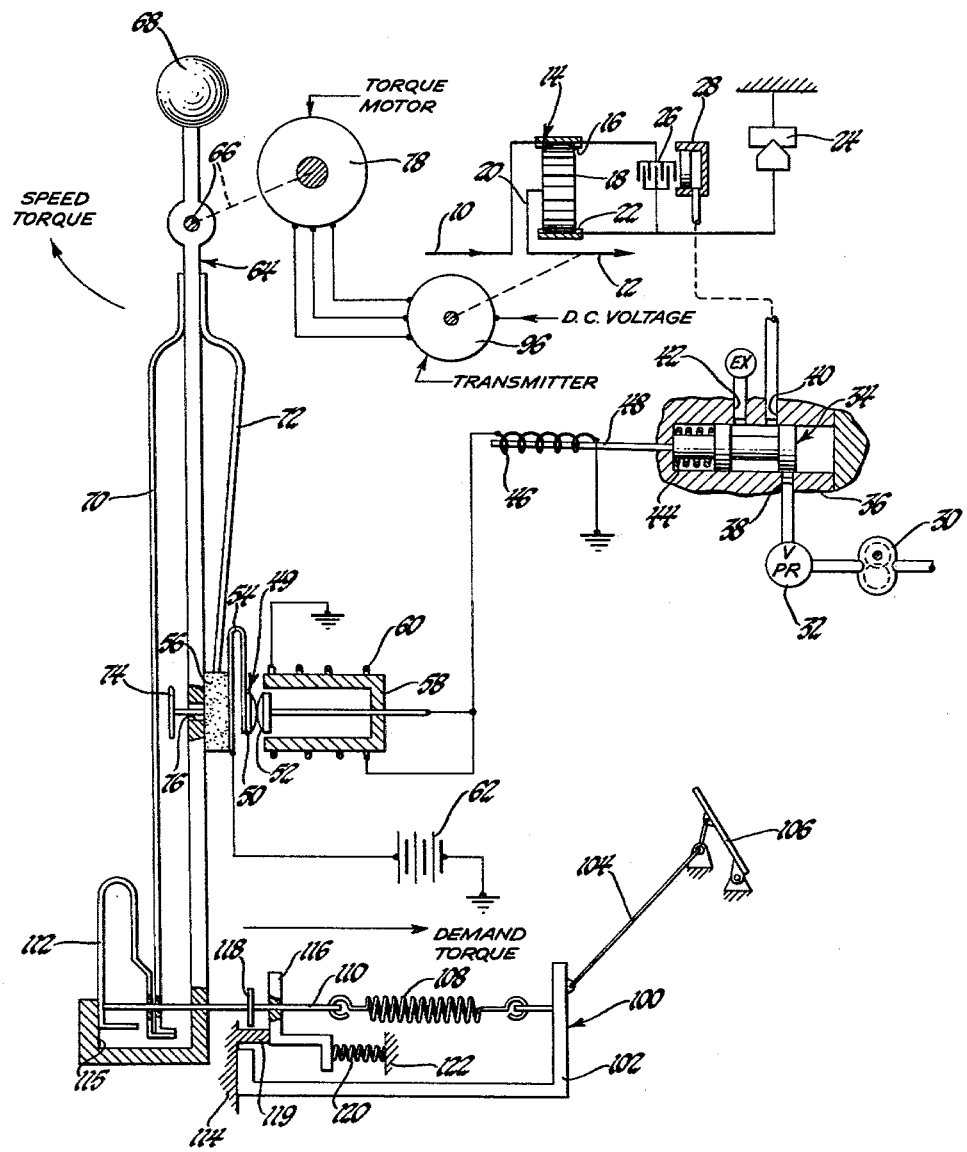

May 4, 1965     J. P. BAIER ETAL     3,181,387

TRANSMISSION CONTROL SYSTEM

Filed Dec. 5, 1962     2 Sheets-Sheet 1

INVENTOR.
John P. Baier,
BY Homer E. Smith, &
William E. Fritz

Hugh L. Fisher
ATTORNEY

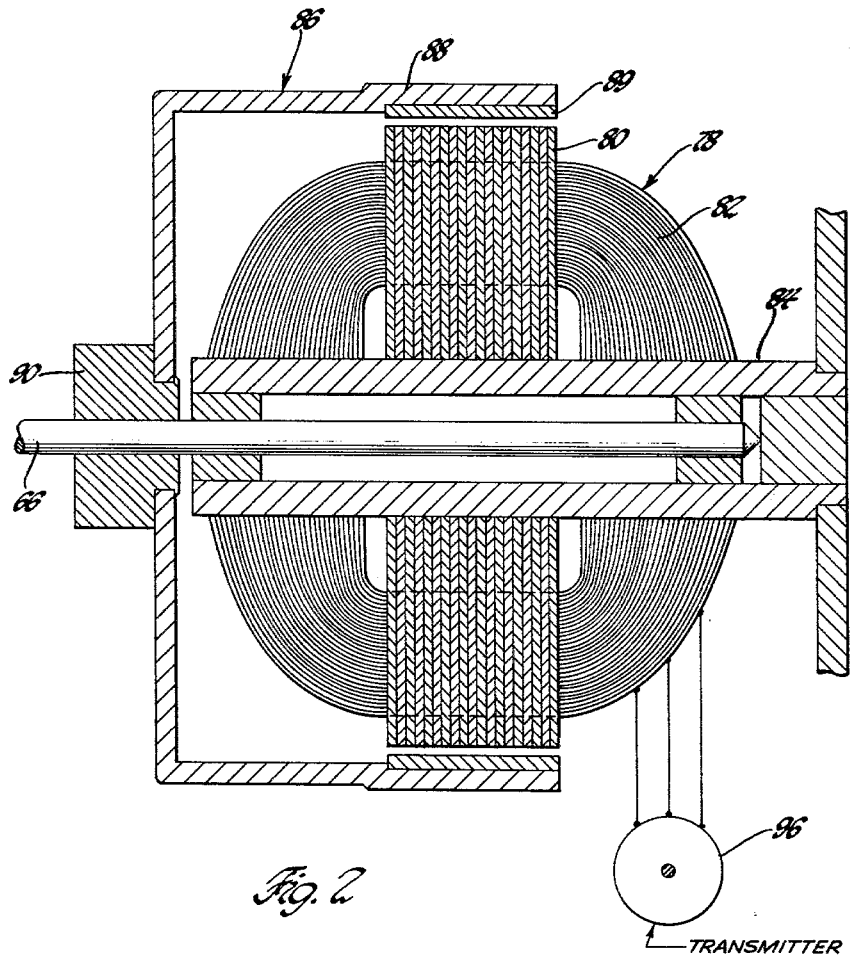

3,181,387
TRANSMISSION CONTROL SYSTEM
John P. Baier, Homer E. Smith, and William E. Fritz, Rochester, N.Y., assignors to General Motors Corporation, Detroit, Mich., a corporation of Delaware
Filed Dec. 5, 1962, Ser. No. 242,419
13 Claims. (Cl. 74—472)

This invention relates to improvements in control systems adapted for use, although not exclusively, with motor vehicle transmissions.

In any automatically operating transmissions of the multistep ratio type, it is necessary to produce shift points that are optimum for the varying conditions of operation such as available engine torque, the torque demand by the driver, road load, and vehicle speed. The control system must evaluate these different operating conditions, particularly vehicle speed and driver demand to insure that, e.g., the transmission does not upshift at a time when the driver is requiring maximum acceleration. Various complex and complicated electrically operated and fluid pressure operated control systems have been provided for this purpose. Each has advantages and disadvantages and additionally both are complex and costly to make as well as to operate and to service. It is, therefore, the objective of this invention to provide a unique control system that is responsive to plural torques. In particular, the invention contemplates a control system incorporating the advantages of both type systems and with a minimum of simple components. The novel control system evaluates different parameters of operation in a completely new way that avoids costly complexity.

It is further proposed to provide by the invention an uncomplicated transmission control system that affords different upshift and downshift points, that is readily adaptable to any shift pattern, that affords full throttle downshifts as well as part throttle downshifts, and that has unique provisions for eliminating "hunting."

The foregoing and other objects and advantages of the invention will be apparent from the following description and the accompanying drawing in which:

FIGURE 1 is a schematic diagram of a transmission and a control system therefor incorporating the principles of the invention; and FIGURE 2 is a schematic diagram of a hysteresis torque motor employed in the FIGURE 1 system.

Referring now to FIGURE 1 in detail, the numerals 10 and 12 designate, respectively, the input and output shafts for a vehicle transmission. These shafts 10 and 12 may be joined respectively to the engine and the wheels for a vehicle in the usual way. The input shaft 10 transfers drive to a planetary gear unit 14, which affords two forward drive ratios. The transition between the two drive ratios is controlled by the depicted control system as will be explained.

Considering the details of the planetary gear unit 14, a ring gear 16 is drive connected to the input shaft 10 and meshes with one or more planet pinions 18 revolvably supported on a planet carrier 20. The planet carrier 20 is drive connected directly to the output shaft 12. Reaction is provided for the gear unit 14 by a sun gear 22 that is prevented from revolving backwards by a one-way device 24. The one-way device 24 may be of any known type utilizing two races between which are interposed a series of one-way elements such as sprags, rollers, etc.

With the reaction sun gear 22 restrained from reverse rotation by the one-way device 24, forward rotation of the input shaft 10 will through the action of the planetary gear unit 14 cause the output shaft 12 to be revolved at a reduced speed determined by the ratio of the gear unit 14. For a direct drive through the gear unit 14, a direct drive clutch 26 is interposed between the ring gear 16 and the reaction sun gear 22. By clutching together these two gears 16 and 22, the gear unit 14 is caused to revolve as a unit and hence, the output shaft 12 will be driven at the same speed as the input shaft 10. The one-way device 24 unlocks at this time since the reaction sun gear 22 is revolved forwardly in direct drive. Of course, the direct drive clutch 26 may be interposed between any other two elements of the gear unit 14 and a direct drive still achieved. In effect, then, the gear unit 14 provides a low drive ratio when the one-way device 24 is effective; and a high drive ratio or a direct drive ratio when the clutch 26 is engaged.

The direct drive clutch 26 is preferably engaged by a fluid pressure operated servo motor 28 of the piston type. Fluid pressure for operating the servo motor 28 is derived from a pump 30, which in this embodiment is driven by the input shaft 10. This fluid pressure from the pump 30 is controlled by a suitable pressure regulator valve 32 and then is transferred to a shift valve 34.

The shift valve 34 is of the spool type and is slidable within a body 36 having an inlet port 38 connected to the pump 30, an outlet port 40 communicating with the servo motor 28, and an exhaust port 42. In the depicted downshifted position of the shift valve 34, the servo motor 28 is drained via the outlet port 40 to the exhaust port 42. Consequently, the direct drive clutch 26 is disengaged and the planetary gear unit 14 will be conditioned for the low drive ratio. When the shift valve 34 is moved to the left and in the upshifted position by a shift spring 44, the exhaust port 42 is closed and communication is established between the inlet and outlet ports 38 and 40. Hence, fluid pressure is applied to the servo motor 28 and the direct drive clutch 26 is engaged for establishing the high drive ratio.

The shift valve 34 is maneuvered between the upshifted and downshifted positions by energizing and deenergizing a relay such as a winding 46. The winding 46 surrounds a valve stem 48 on the shift valve 34, and therefore the stem 48, performs as an armature. When the winding 46 is energized, the shift valve 34 will be moved to the downshifted position illustrated. Of course, when the winding 46 is deenergized, the shift spring 44 will bias the shift valve 34 to the upshifted position as was just explained.

The energization of the winding 46 is controlled by a circuit control device, which is preferably in the form of a switch denoted generally at 49. The switch 49 comprises a movable contact 50 and a fixed contact 52. The movable contact 50 is suspended on a U-shaped spring 54, which is secured to an insulator block 56, whereas the fixed contact is positioned within a metallic body 58, which is surrounded by a winding 60. The U-shaped spring 54 dampens vibrations of the movable contact 50 and thereby prevents contact arcing. When the contacts 50 and 52 are engaged, a circuit is completed between a D.C. source, e.g., a battery 62, and the winding 46. Also, a circuit is completed between the battery 62 and the winding 60 such that the body 58 is magnetized so as to urge the contacts 50 and 52 together with a greater force for reasons to be explained.

The energization and deenergization of the winding 46 and, accordingly, the control of the shift valve 34, is determined in the FIGURE 1 embodiment by two parameters, vehicle speed and driver or torque demand on the engine. These two parameters are correlated by a controller such as a balance or control lever designated generally by the numeral 64. The balance lever 64 is pivotally mounted on a shaft 66 near the upper end thereof and includes at this upper end a balance weight 68. Joined to opposite sides of the balance lever 64 are depending spring arms 70 and 72. The spring arm 72 is secured at the lower end to the insulator block 56 and exerts a bias that urges the block 56 against the side of the balance lever 64 as illustrated. This bias is of slightly less force than that derived from magnetic action of the metallic body 58 and the winding 60. In the illustrated position of the insulator block 56 a stop flange 74 connected to the block 56 through an opening 76 in the balance lever 64 is stationed its greatest distance from the balance lever 64. The stop flange 74 serves a function to be explained.

Rotation of the balance lever 64 in a clockwise direction indicated by the speed torque arrow is produced by a speed torque motor 78. The speed torque motor 78 is of the hysteresis type and transfers to the shaft 66 a torque proportional to vehicle speed. The motor 78 may be of the type disclosed in the application S.N. 218,784 to Fritz et al., entitled "Transmission Control System" and filed August 22, 1962. Briefly, and with reference now to FIGURE 2, the motor 78 comprises an inside stator 80 including a winding 82. The stator 80 is affixed to a stationary hollow shaft 84. A rotor 86 comprising an aluminum cup 88 and a steel ring 89 press fitted into the cup 88 encircles the stator 80 and is secured through a hub 90 to the shaft 66. The shaft 66 is journaled within the hollow shaft 84. The stator winding 82 is depicted as the three-phase type and is energized by a transmitter 96.

The transmitter 96 is of a known type, which is revolved at a speed proportional to that of the output shaft 12. The transmitter 96 may be of the form described in the U.S. Patent 3,043,922, issued July 10, 1962, to Fritz et al. In operation the transmitter 96 converts a direct voltage into a three-phase alternating voltage of constant amplitude and of a frequency that varies with the rotative speed of the output shaft 12.

The transmitter 96 and the speed torque motor 78 cooperate so that when the stator winding 82 is energized by this three-phase alternating voltage from the transmitter 96, a revolving field is produced in the same manner as in an A.C. motor. Because of the magnetic hysteresis in the ring 89, the flux density lags behind the magnetic intensity. By this effect, the axis of the hysteresis poles on the rotor 86 is in quadrature with the inducing revolving field axis and hence, produces a torque on the rotor 86 that can be calibrated to correspond to the vehicle speed. It is this torque that is hereinafter referred to as a speed torque and that is utilized for urging the balance lever 64 in the clockwise direction.

To reflect driver demands, a driver or torque demand generator, viewed generally at 100 in FIGURE 1, is employed for urging the balance lever 64 in a counterclockwise direction as indicated by the arrow designated demand torque. The torque demand generator 100 includes a U-shaped member 102 that is attached by a linkage 104 to a conventional accelerator pedal 106. The U-shaped member 102 can be appropriately connected directly to the vehicle throttle linkage or arranged so as to respond to changes in intake manifold pressure as will be appreciated by those versed in the art. The choice will be determined by the application of the system but in each instance reflects a driver demand or desire. Movements of the accelerator pedal 106 and accordingly of the U-shaped member 102 are transferred to the balance lever 64 through an accelerator spring 108, a shaft 110, a part throttle downshift control spring 112 and the spring arm 70. The accelerator spring 108 at opposite ends is respectively connected to the U-shaped member 102 and the shaft 110, whereas the shaft 110 at the opposite end is fixedly joined to the part throttle downshift control spring 112. It will be noted that the part throttle downshift control spring 112 engages the edge of the depending spring arm 70. The preload bias from the spring arm 70 and the spring 112 equals the closed throttle force from the accelerator spring 108. In other words, the accelerator pedal 106 is as a result urged to the closed throttle position with some predetermined force determined by the preload bias of the spring arm 70 and the spring 112. At this time the U-shaped member 102 is urged against a closed throttle stop 114. This preload bias on the spring 112 is established by a stop 115. The accelerator spring 108 additionally functions as a return for the torque motor 78, i.e., the spring 108 urges the shaft 66 to an initial starting position.

The torque demand generator 100 also incorporates a detent provision in the form of a detent flange 116, which encircles the shaft 110 proximate a detent pin 118 on the shaft 110. The detent flange 116 is displayed in the closed throttle position against a stop 119. The flange 116 is urged to this position by a detent spring 120 interposed between the detent flange 116 and a detent stop 122. As the member 102 is moved to the right in FIGURE 1 and to the detent position, the detent flange 116 is moved by the pin 118 towards the stop 122 and the resultant tension from the spring 108 is felt by the spring 112. Prior to this, the tension from the spring 108 (beyond a certain throttle position) was not sensed by the spring 112.

In describing the operation, the events occurring prior to an upshift will first be described. The balance lever 64 will be assumed to be in the FIGURE 1 low drive ratio position. Therefore, with the winding 46 energized, the shift valve 34 will be in the illustrated downshifted position and the servo motor 28 drained. As vehicle speed increases, the speed torque developed by the torque motor 78 will accordingly increase. When the increasing speed torque overcomes the demand torque developed by the torque demand generator 100, the balance lever 64 will commence to revolve clockwise.

At approximately the equivalent of 13 m.p.h. of speed torque, the spring arm 70 will bottom against the side of the balance lever 64. The spring arm 70 helps to stabilize the point at which the closed throttle downshift occurs, as will be explained.

At approximately the equivalent of 17 m.p.h. of speed torque, the part throttle downshift control spring 112 will be bottomed against the side of the balance lever 64 or will assume its full load position. This spring 112, as will become apparent, aids in preventing part throttle downshifts above the speed of 17 m.p.h.

At approximately 20 m.p.h. with a minimum throttle opening or at 45 m.p.h. with a full throttle opening, the flange 74 will have engaged the side of the balance lever 64 such that further movement of the balance lever 64 will force the movable contact 50 out of engagement with the fixed contact 52. It should be kept in mind that the magnetic force holding the contacts 50 and 52 engaged is slightly greater than the opposing bias from the spring arm 72; therefore, the insulator block 56 is separated from the side of the balance lever 64 as the balance lever 64 moves in the clockwise direction. As will be appreciated, between 20 and 45 m.p.h., the point at which this occurs will vary according to the proportion of speed torque and demand torque. The separation of the contacts 50 and 52 causes the winding 46 to be deenergized and the shift valve 34 to be moved to its upshifted position by the shift spring 44. In the upshifted position, the servo motor 28 has fluid pressure applied thereto and the direct clutch 26 is engaged for establishing the high drive ratio through the gear unit 14.

After the upshift the magnetic force is removed and the insulator block 56 and the movable contact 50 are therefore returned to the depicted FIGURE 1 position by the spring arm 72, i.e., with the insulator block 56 against the side of the balance lever 64.

As mentioned, at speed torques equivalent to 17 m.p.h. and above, no part throttle downshift is possible, only so-called detent downshifts can be achieved. This is because after an upshift has occurred, and above the 17 m.p.h. speed torque, the springs 112 and 70 are both bottomed on the side of the balance lever 64. The distance from the lever 64 to the stop pin 118 is then constant. When the tension of the accelerator spring 108 is increased by depressing the accelerator pedal 106, the detent pin 118 will engage the detent flange 116 before the contacts 50 and 52 can engage. Once the tension on the spring 108 is sufficient to move the detent pin 118 into engagement with the detent flange 116, any further increase in the tension on the spring 108, i.e., any increase in tension that is less than that required for the detent downshift, will only be felt by the stop pin 118 pressing against the flange 116 and will not be felt by the arm 64. To engage these contacts 50 and 52, it is necessary to proceed to the detent position by further depressing the accelerator pedal 106. This requires that extra effort be exerted on the accelerator pedal 106 so as to compress detent spring 120 against the detent stop 122 and thereby move the detent flange 116 sufficiently far to be out of the interfering position relative to the stop pin 118. When this happens, the full force from the accelerator spring 108 is transferred to the balance lever 64 and then to the block 56 and the movable contact 50. The contacts 50 and 52 will engage and the shift valve 34 will move to its downshifted position if the speed torque is not great enough to resist this full force. In this downshifted position, as described, the transmission downshifts to the low drive ratio.

Describing now a part throttle downshift, it will be necessary to assume that the speed torque is equivalent to a value less than 17 m.p.h. and that the transmission is conditioned for the high drive ratio. These part throttle downshifts can be produced at any speed between the closed throttle downshift speed, which may be 10 m.p.h., and the mentioned 17 m.p.h. To initiate such a shift the accelerator pedal 106 must be depressed far enough that the tension on the spring 108 will be equal to, or greater than, the speed torque on lever 64. By way of example, a part throttle downshift at a 13 m.p.h. speed torque would require only a slight depression of the accelerator pedal 106, whereas a part throttle downshift at a speed torque of 16 m.p.h. would demand a substantial accelerator pedal movement. At speed torques less than 17 m.p.h., the spring 112 will not be bottomed; therefore, the contacts 50 and 52 can engage before the detent pin 118 encounters the detent flange 116. As explained, above the 17 m.p.h. speed torque the spring 112 will be bottomed and the stop pin 118 will contact the detent flange 116 before the contacts 50 and 52 can engage. During this part throttle downshift, the balance lever 64 will have revolved counterclockwise and carry therewith the insulator block 56, which, as has been explained, is maintained against the balance lever 64 when the contacts 50 and 52 are separated, and the movable contact 50 so that engagement is effected with the fixed contact 52. Hence, the downshift will take place as just mentioned.

The part throttle downshift control spring 112 function can now be understood, since at above speed torques equivalent to 17 m.p.h., the spring 112 will have bottomed. This additional movement in bottoming the spring 112 will move the balance lever 64 sufficiently far clockwise so that the depression of the accelerator pedal 106 to develop a part throttle downshift cannot take place prior to the stop pin 118 engaging the detent flange 116. As mentioned, the contacts 50 and 52 cannot engage at this time.

It should be noted here that the magnetic force from the metallic body 58 and the energization of the winding 60 aids in holding the contacts 50 and 52 together until the upshift occurs so that the speed torque required for an upshift will be higher than for a downshift under equivalent conditions. By way of example, a zero throttle upshift can occur at 20 m.p.h., whereas the zero throttle downshift would take place at 10 m.p.h. If the upshift and the downshift both occurred at 20 m.p.h., it will be appreciated that "hunting" can take place, particularly if driving in traffic and vehicle speed is varying above and below the 20 m.p.h. value.

During an upshift, the forces to be overcome to separate the contacts 50 and 52 include this magnetic force and the force from the accelerator spring 108. During a closed throttle downshift, the force from the spring arm 70 or the preload of the spring 108 is determinative, whereas during a part throttle downshift, the force from the spring 108 controls.

For a closed throttle downshift to take place, the accelerator pedal 106, of course, must be in its closed throttle position. When the resultant demand torque from the spring arm 70 is sufficiently greater than the equivalent speed torque at 10 m.p.h., the balance lever 64 will be moved counterclockwise until the contacts 50 and 52 engage. The downshift will now occur.

As suggested, the closed throttle downshift can occur at speed torques equal to 10 m.p.h., whereas the spring arm 70 can bottom on the side of the balance lever 64 at a speed torque of 13 m.p.h. Hence, when vehicle speed is decreasing and the throttle is closed, the influence of the spring arm 70 will become effective at the equivalent of a 13 m.p.h speed torque and introduce a bias that will absorb any variations in the speed torque which would otherwise alter the 10 m.p.h. speed torque value. This feature stabilizes the closed throttle downshift point.

It should be understood that the various actual values used throughout the description are only exemplary and are to facilitate an understanding of the invention. The values are not to be construed as in any way limiting the invention.

From the foregoing, it will be appreciated that a single controller can be utilized to effect transitions between two different drive ratios. If additional ratios are to be controlled, then a corresponding number of contacts can be employed while still utilizing the same balance lever 64, the same torque motor 78, and the same torque demand generator 100. This arrangement eliminates the need for complex electrical and hydraulic controls. Moreover, numerous calibrating controls are not needed. Therefore, the simplified arrangement has a low initial cost and because subsequent service can be done easily, the service costs are substantially reduced.

The invention is to be limited only by the following claims.

We claim:

1. In a control system, the combination of an electrically operated control valve having a circuit for operating the control valve and including a circuit control device having a plural state, a force responsive controller movable in one direction for causing the circuit control device to assume one state and in another direction for causing the circuit control device to assume another state, means maneuvering the controller in the one or the other direction, the maneuvering means including means urging the controller in the one direction with a force corresponding to one characteristic of the system and another means urging the controller in the other direction with a force corresponding to another characteristic of the system, and means rendering the sum of the forces required for causing the controller to place the circuit control device in one of the plural states to be different from the sum of the forces required to place the circuit control device in another of the plural states.

2. In a control, the combination of a relay having plural states, a torque responsive controller movable in one direction for causing the relay to have one state and in another direction for causing the relay to have another state, means maneuvering the controller in the one or the other direction as determined by the summation of the torques applied thereto, the maneuvering means including means urging the controller in the one direction with a torque corresponding to one characteristic of the control, means urging the controller in the other direction with a torque corresponding to another characteristic of the control, means requiring the sum of the torques to be different for causing the relay to assume one of the plural states, and means stabilizing the movements of the controller.

3. In a control, the combination of switch means having opened and closed settings, a force responsive controller movable in one direction for opening the switch and in another direction for closing the switch, means maneuvering the controller in the one or the other direction as determined by the summation of forces acting on the controller, the maneuvering means including first force generating means urging the controller in one direction and second force generating means urging the controller in the other direction, and means causing the required sum of the first and second forces to be greater for opening the switch.

4. In a control system, the combination of switch means having open and closed settings, a pivotably mounted control member revolvable in one direction for placing the switch in the open setting and in another direction for placing the switch in the closed setting, means maneuvering the controller in the one or the other direction as determined by the summation of torques applied to the control member, the maneuvering means including motor means for urging the control member in the one direction with a torque proportional to a characteristic of the system, means urging the controller in the other direction with a torque proportional to a certain demand of the system, and means controlled by the switch means in the closed setting for requiring that the sum of the torques be greater for moving the switch means to the open setting than for moving the switch to the closed setting.

5. In a drive ratio control system, the combination of means conditioning the system for high and low drive ratios, a torque responsive controller movable in one direction for causing the conditioning means to establish the high ratio and movable in another direction for causing the conditioning means to establish the low ratio, and means maneuvering the controller in the one or the other direction as determined by the sum of the torques applied thereto, the maneuvering means including means urging the controller in the one direction with a torque corresponding to one characteristic of the system and means urging the controller in the other direction with a torque corresponding to another characteristic of the system.

6. In a transmission control system, the combination of means conditioning the transmission for shifting between low and high drive ratios, a torque responsive controller for the conditioning means, and means maneuvering the controller in accordance with the sum of the torques applied thereto, the maneuvering means including torque generating means for applying to the controller a torque that varies with the speed of the transmission and a torque generator for applying to the controller a torque corresponding to a driver demand.

7. In a transmission for a motor vehicle, the combination of drive ratio establishing means for conditioning the transmission for transition between low and high drive ratios, a torque responsive controller for the drive ratio establishing means, means maneuvering the controller in increasing and decreasing drive ratio directions as determined by the sum of the torques applied thereto, the maneuvering means including a torque generating means for applying a torque to the controller proportional to the speed of the vehicle and a torque generator for applying an opposing torque to the controller in accordance with torque demand, and means causing the transition from the low to high drive ratios to occur at a point different from the transition from the high to low drive ratios.

8. In a transmission control system for a motor vehicle, the combination of electrically controlled drive ratio establishing means for conditioning the transmission for transition between low and high drive ratios, the drive ratio establishing means including a switch having open and closed settings for causing the drive ratio establishing means to respectively condition the transmission for high and low drive ratios, a pivotally mounted control lever revolvable in a drive ratio decreasing direction for closing the switch and in an increasing drive ratio direction for opening the switch, and means maneuvering the controller in the increasing and decreasing ratio directions as determined by the sum of the torques applied thereto, the maneuvering means including a torque motor arranged so as to urge the control lever in the increasing ratio direction as the speed of the vehicle increases and a torque generator for urging the control lever in the decreasing drive ratio direction as torque demand increases.

9. In a transmission control system, the combination of electrically operated drive ratio establishing means for conditioning the transmission for transition between high and low drive ratios, the electrically operated drive ratio establishing means including a switch having plural settings corresponding to the low and high drive ratios, a torque responsive controller for actuating the switch to the plural settings, means maneuvering the controller between a low ratio position and a high ratio position as determined by the sum of the torques applied thereto, the maneuvering means including a torque motor responsive to the speed of the vehicle for applying a corresponding torque to the controller so as to urge the controller towards the high drive ratio position as the vehicle speed increases and a torque generator responsive to driver demand for developing a corresponding torque so as to urge the controller towards the low ratio position as driver demand increases, and means preventing a transition from the high drive ratio to the low drive ratio within a certain vehicle range until a predetermined driver demand is made.

10. In a transmission control system, the combination of electrically operated drive ratio establishing means for conditioning the transmission for transition between high and low drive ratios, the electrically operated drive ratio establishing means including a switch having plural settings corresponding to the low and high drive ratios, a torque responsive control member for actuating the switch to the plural settings, means maneuvering the control member between a low ratio position and a high ratio position, the maneuvering means including a torque motor responsive to the speed of the vehicle for applying a corresponding torque to the control member so as to urge the control member towards the high drive ratio position as the vehicle speed increases and a torque generator responsive to driver demand for developing a corresponding torque for urging the control member towards the low ratio position as driver demand increases, means rendered operative by the switch for requiring that the sum of torques for establishing one of the drive ratios be greater than the sum of the torques for establishing the other drive ratio.

11. In a transmission control system for an engine driven vehicle, the combination of electrically operated drive ratio establishing means for conditioning the transmission for transition between high and low drive ratios, the electrically operated drive ratio establishing means including a switch having a movable contact and a fixed contact so arranged in a closed setting as to cause the electrically operated drive ratio establishing means to condition the transmission for the low drive ratio and in the open setting to condition the transmission for the high drive ratio, a pivotally mounted control member having the movable contact movably positioned thereon, means maneuvering the control member between a low ratio position in which the contacts are closed and a high ratio position in which the contacts are opened, the maneuvering means including a speed torque motor responsive to the speed of the vehicle for applying a corresponding speed torque to the control member so as to urge the control member towards the high drive ratio position as the vehicle speed increases and a torque demand torque generator responsive to torque demand on the engine for developing a corresponding torque so as to urge the control member towards the low ratio position as torque demand increases, means rendered operative when the contacts are closed for increasing the required force for separating the contacts and thereby requiring that the torque for pivoting the control member to the high ratio position be greater than the torque required to pivot the control member to the low ratio position after the contacts are separated so that the point at which the low to high drive ratio occurs is different from the point at which the high to low drive ratio change occurs, and means preventing the control member from being pivoted to the low ratio position until a predetermined torque demand is made.

12. In a transmission control system for an engine driven vehicle, the combination of electrically operated drive ratio establishing means for conditioning the transmission for transition between high and low drive ratios, the electrically operated drive ratio establishing means including a switch having a movable contact and a fixed contact so arranged in a closed setting as to cause the electrically operated drive ratio establishing means to condition the transmission for the low drive ratio and in the open setting to condition the transmission for the high drive ratio, a pivotally mounted control member having the movable contact movably positioned thereon, means maneuvering the control member between a low ratio position in which the contacts are closed and a high ratio position in which the contacts are opened, the maneuvering means including a speed torque motor responsive to the speed of the vehicle for applying a corresponding speed torque to the control member so as to urge the control member towards the high drive ratio position as the vehicle speed increases and a torque generator responsive to torque demand on the engine for developing a corresponding torque so as to urge the control member towards the low ratio position as torque demand increases, means rendered operative when the contacts are closed for increasing the required force for separating the contacts and thereby requiring that the torque for pivoting the control member to the high ratio position be greater than the torque required to pivot the control member to the low ratio position after the contacts are separated so that the point at which the low to high drive ratio occurs is different from the point at which the high to low drive ratio change occurs, means preventing the control member from being pivoted to the low ratio position within a certain speed torque range, and means stabilizing the points at which a transition is made between the high and the low drive ratios.

13. In a vehicle transmission control system for a throttle controlled engine driven vehicle, the combination of electrically operated drive ratio establishing means for conditioning the transmission for transition between high and low drive ratios, a torque responsive controller for the drive ratio establishing means, means maneuvering the controller between low ratio and high ratio positions, the maneuvering means including a speed torque motor responsive to the speed of the vehicle for applying a corresponding speed torque to the control member so as to urge the control member towards the high drive ratio position as the vehicle speed increases and a throttle torque generator responsive to throttle position for developing a corresponding throttle torque so as to urge the control member towards the low ratio position as the throttle opening increases, means rendered operative when the controller is in the low ratio position for causing the torque for urging the controller to the high ratio position to be greater than the torque required to urge the controller to the low ratio position so that the transition from the low to high drive ratio occurs at a point different from the transition from the high to low drive ratio, detent means preventing the controller from being pivoted to the low ratio position in a certain speed torque range until the throttle is moved beyond a full throttle positions, means stabilizing closed throttle transitions from the high drive ratio to the low drive ratio, and means providing part throttle transitions from the high drive ratio to the low drive ratio below the certain speed torque range.

References Cited by the Examiner
UNITED STATES PATENTS
3,019,666  2/62  Brennan et al.
3,023,353  2/62  Currey _____ 200—102.1 X DON A. WAITE, *Primary Examiner.*

UNITED STATES PATENT OFFICE
CERTIFICATE OF CORRECTION

Patent No. 3,181,387                      May 4, 1965

John P. Baier et al.

It is hereby certified that error appears in the above numbered patent requiring correction and that the said Letters Patent should read as corrected below.

Column 5, line 44, after "116" insert a period --; column 6, line 50, for "a plural state" read -- plural states --; column 10, line 32, for "positions" read -- position --.

Signed and sealed this 28th day of September 1965.

(SEAL)
Attest:

ERNEST W. SWIDER                              EDWARD J. BRENNER
Attesting Officer                                  Commissioner of Patents